US012034209B2

(12) United States Patent
Pavlik

(10) Patent No.: US 12,034,209 B2
(45) Date of Patent: Jul. 9, 2024

(54) AXIAL MODE HELICAL ANTENNA WITH IMPROVED/SIMPLIFIED PARALLEL OPEN WIRE IMPEDANCE MATCHING TECHNIQUE

(71) Applicant: Stephen Pavlik, Austin, TX (US)

(72) Inventor: Stephen Pavlik, Austin, TX (US)

(*) Notice: Subject to any disclaimer, the term of this patent is extended or adjusted under 35 U.S.C. 154(b) by 33 days.

(21) Appl. No.: 17/731,381

(22) Filed: Apr. 28, 2022

(65) Prior Publication Data

US 2022/0352624 A1 Nov. 3, 2022

Related U.S. Application Data

(60) Provisional application No. 63/183,454, filed on May 3, 2021.

(51) Int. Cl.

*H01Q 11/08* (2006.01)
*H01Q 1/42* (2006.01)
*H01Q 5/50* (2015.01)

(52) U.S. Cl.

CPC ............... *H01Q 11/08* (2013.01); *H01Q 1/42* (2013.01); *H01Q 5/50* (2015.01)

(58) Field of Classification Search

CPC ........... H01Q 1/362; H01Q 1/42; H01Q 5/50; H01Q 11/08; H01Q 11/083; H01Q 11/086

See application file for complete search history.

(56) References Cited

U.S. PATENT DOCUMENTS

2003/0020669 A1* 1/2003 Yasukawa ............ H01Q 21/067 343/895
2003/0156072 A1* 8/2003 Price ...................... H01Q 11/08 343/895

OTHER PUBLICATIONS

Slobodan V. Savić, Milan M. Ilić, Antonije R. Djordjević, "Design of Internal Wire-Based Impedance Matching of Helical Antennas Using an Equivalent Thin-Wire Model", International Journal of Antennas and Propagation, vol. 2017, Article ID 7365793, 5 pages, 2017. https://doi.org/10.1155/2017/7365793 (Year: 2017).*

* cited by examiner

*Primary Examiner* — Robert Karacsony

(57) ABSTRACT

A low-profile axial mode helical type antenna that employs hollow copper tubing for the radiating element, a singular semi hollow dielectric support structure, low pitch angle and an improved/simplified parallel open wire impedance matching technique. This antenna has a wide radiating pattern as well as high forward gain and circular polarization. It is designed to work in the field of live entertainment including reception and transmission of wireless microphones, in-ear monitors, communications and cue control systems. It operates from 470-663 MHz.

20 Claims, 7 Drawing Sheets

AXIAL MODE HELICAL ANTENNA WITH IMPROVED/SIMPLIFIED PARALLEL OPEN WIRE IMPEDANCE MATCHING TECHNIQUE

CROSS-REFERENCE TO RELATED APPLICATION

This application claims the benefit of U.S. Provisional Patent Application No. 63/183,454, filed May 3, 2021, which is incorporated by reference herein in its entirety.

FIELD OF INVENTION

The present invention relates generally to radio frequency antennas, and more particularly to a low-profile axial mode helical antenna to be used in live entertainment production that has an improved and simplified impedance matching technique.

BACKGROUND OF INVENTION

Axial mode helical antennas have been used for years in many wireless communication applications including the live entertainment industry for reception and transmission of wireless microphones, in-ear monitors, communications and cue control systems. This is due to the advantages of axial mode helical antennas such as circular polarization, large operational bandwidth and forward gain. Their construction is simple. There is a conductive ground plane, usually circular, but can be other shapes, where the connector for the antenna is located and where the shield of the connector makes contact to the ground plane. Perpendicular to the ground plane is a conductor wound in the shape of a helix which looks like a spring with progressing coils with varying or fixed pitch. One end of the helix terminates to the center conductor of the connector and the other end open or in "free space". This helix forms the radiating element of the antenna. However, axial mode helical antennas naturally have an impedance of approximately 140 ohms and need to be matched to the transmission or reception system's characteristic impedance that is commonly 50 ohms. If not matched, power will be reflected, which is detrimental to any radio frequency system the antenna is connected to. This impedance match is commonly done using a conductive metal strip that is either flat and parallel to the ground plane, tapered and included in the first ¼ turn of the helix or a microstrip transmission line of varying shape, possibly with electrical components such as capacitors or resistors. Alternately, using a ¼ wavelength piece of higher impedance transmission line (in relation to the wavelength of the operating frequency of the antenna) for the first ¼ turn of the helix is also possible. While the latter of these techniques has the advantage of simplicity, and most previously mentioned techniques can be cost effective, none of them offer a very consistent impedance match throughout the majority of the antenna's bandwidth. The average reflected power throughout the tuning bandwidth of the previously mentioned matching techniques, especially those used in live entertainment helical antennas, can be approximately 5.5-11 percent or more. This leaves room for improvement. This can become a notable problem when many in-ear monitor transmission systems are frequency modulated. This analog frequency modulated systems can benefit from a lower audible noise floor when implemented in a radio frequency system using antennas with a better impedance match of approximately 1% average reflected power. In addition to an improved impedance match, there is another area in helical antennas that can be improved upon. With the use of axial mode helical type antennae in live event production, small form and portability is greatly desired. This can be difficult to achieve while satisfying the criteria of the traditional helical formula wherein a minimum of 3 to 4 turns for the helix radiating element and a minimum pitch angle of 12 to 14 degrees is electrically ideal. This, however, can make the axial length too long to be considered portable or small form. In conclusion, it is undoubtable that an antenna with lower reflected power across its entire tuning bandwidth is a better antenna than those with higher levels of reflected power in their tuning bandwidths. It is also undoubtable that in a portable application, it would be beneficial to have the helical antenna's axial length shortened if the electrical and radiating characteristics of the antenna are not compromised.

Axial mode helical antennas have been used for years in the music industry for reception and transmission of wireless microphones, in-ear monitors, communications and cue control systems. This is due to the advantages of circular polarity, large bandwidth and forward gain that are inherent to axial mode helical antennas. However, axial mode helical antennas have an impedance around 140 ohms and need to be matched to the transmission or reception system's characteristic impedance of 50 ohms. This impedance match is commonly done using a conductive metal strip that is either flat and parallel to the ground plane, tapered and included in the first ¼ turn of the helix or a microstrip transmission line of varying shape, possibly with electrical components such as capacitors or resistors. Alternately, using a ¼ wavelength piece of higher impedance transmission line (in relation to the wavelength of the operating frequency of the antenna) for the first ¼ turn of the helix is also possible These impedance matching techniques have a few short falls such as the geometry of these strips can be complex, many times it has a tapered cut adding challenges to the R&D and cost of manufacturing for this type of impedance match. The same is true regarding complexity with a microstrip type impedance match. More crucial is the fact that these impedance matches are generally not consistent throughout the entire tuning bandwidth of the antenna. They fluctuate many times between a good match and a mediocre match throughout the bandwidth of the antenna, leaving room for improvement.

Prior arts and devices used for the previous scenario do not effectively provide solutions to the above-mentioned problem. Much effort has been made to maximize specific functions of axial mode helical antennas such as gain, bandwidth and axial ratio in respect to the physical dimensions of the antenna. This is seen heavily in prior art such as helices with variable pitch angles, different diameter helices in one assembly, multiple helixes wrapped in the same axis, as well as a more straight-forward approach consisting of a tapered design such as antennae utilizing a conical or hemispheric type helix element. These designs can help with portability by reducing the size of the antenna. However, very few make mention of their impedance match and in the case that one does, it is of prior knowledge or still suffers from an inconsistent and fluctuating impedance match across the antenna's operating bandwidth.

DESCRIPTION OF PRIOR ARTS

U.S. Pat. No. 6,239,760B1 An electrically small broadband antenna comprises a plurality generalized contra wound toroidal helical antenna elements, each made from a single continuous conductor divided into two length portions each of which are substantially the same length and which have a generalized helical pattern, wherein the helical pitch senses the two length portions are opposite to one another, and the two length portions are insulated from one another and overlap one another on the surface of a generalized toroid. Each antenna element incorporates a signal coupler with an impedance matching network, wherein the first ports of the plurality of signal couplers are in proximate location to one another and are connected together to a common signal input port, and the second ports of the respective signal couplers are connected to the respective signal feed ports at the node locations where the respective length portions join one another, or at a diametrically opposite location.

U.S. Pat. No. 5,892,480A Optimization of the exchange of energy between a free space wave and current flowing in the conductive helix of an axial mode, helical antenna is achieved by varying the pitch angle of successive turns of the antenna along the axis of the antenna, from a relatively small pitch angle at the base, feed location of the antenna, to a relatively large value at the distal end of the antenna. Pitch angles of successive turns of the antenna are varied in a non-linear manner to correspond to the non-linear manner in which the phase velocity of a wave propagating through the antenna varies relative to the phase velocity of a free space electromagnetic wave. For the case of an axial mode, helical antenna operating at C-band, the pitch angle of said antenna may be varied between 3-8 degrees at the antenna feed point to 20-30 degrees at its free space-interfacing distal end. The variable pitch angle antenna has a gain versus bandwidth characteristic that contains a plurality of spaced apart peak regions, one of which has a peak gain slightly less than the other. This dual peak gain behavior permits application design tradeoff between a smaller sized antenna with slightly reduced performance versus a larger sized antenna with slightly higher performance.

U.S. Pat. No. 8,436,784B2 Novel reconfigurable antennas are provided which may be used to accommodate the requirements for wideband multi-standard handheld communication devices. It is shown that using a shape memory alloy spring actuator, the height of a helical antenna and therefore the pitch spacing and angle can be varied. This can in turn tune the far-field radiation pattern and gain of the antenna dynamically to adjust to new operating conditions. The radiation pattern can further be directed using a two-helix array. Finally, a helical antenna embodiment is implemented and measured using a shape memory alloy actuator. Measurement results confirm that while keeping the center frequency constant, gain tunability can be attained using this structure.

U.S. Pat. No. 4,935,747A An axial mode helical antenna includes a metal belt member disposed around the reflector of the antenna in order to permit use of reduced diameter reflectors and, therefore, to produce a small helical antenna having increased directivity.

U.S. Pat. No. 7,038,636B2 A helical antenna having a helix supported by a helix support. The helix support includes at least one piece of flexible sheet having its two surfaces covered with a layer antistatic material. The flexible sheet is curl able into a revolution surface configuration to form a revolution surface-shaped support section for at least partially supporting a portion of the helix component there around. A grounding mechanism electrically grounds the external sheet surface to the helix and the two sheet surfaces to one another when in the revolution surface configuration while a locking mechanism locks the flexible sheet in the revolution surface configuration. The combination of the helix and the flexible support renders the antenna structurally relatively rigid in all directions.

U.S. Pat. No. 4,772,895A An antenna is provided which includes first and second helical elements which are separated by a dielectric spacer. The first helical element is fed a radio frequency driving signal and the remaining second element is coupled to ground. The first and second elements are coupled together in a fashion which results in a dramatic increase in antenna bandwidth in comparison to prior helical antennas.

U.S. Pat. No. 9,142,882B2 A spiral, helical antenna is configured to produce a generally circular polarized radiation pattern covering a range of frequencies, over a ground plane. The antenna is comprised of a spring-like spiral conductor that may be held in compression by a size and shape regulating outer nonconductive membrane. The assembly may be compressed and or extended to adjust the antenna for best performance in a particular situation. The assembly may be compressed into a generally flattened state for storage and or transportation, and extended at a later time for use. Accurate antenna dimensions and good performance are afforded by the use of high-quality spring materials in conjunction with precise membrane dimensions.

U.S. Pat. No. 7,714,796B1 A hemispherical helical antenna employs a support frame assembly. The support frame assembly is configured to align and stabilize the turns of the helical antenna element above the ground plane. The support frame assembly includes a plurality of panels manufactured from a dielectric material. The panels are disposed at a fixed angular orientation that defines a central axis and form a series of supports for the element.

The present invention is very similar to already existing Helical antenna, but with a unique configuration. The main feature of the present invention is the impedance match of the antenna. Using an open wire parallel to the first quarter turn creates a "new" type of impedance match that is somewhere between the physical properties of the flat copper strip and a tapered copper strip or microstrip. The open wire impedance match should, in theory, be the same diameter of the element of the helix. However, in this particular antenna, the open wire impedance match diameter was lowered for multiple reasons. The helix is constructed with a 6.35 mm diameter copper tube. This helps with the bandwidth of the antenna and impedance match. However, it is large and difficult to bend which will become necessary for fine tuning. By lowering the open wire impedance match to 2.05 mm diameter solid copper wire (12 AWG), many benefits are realized. 1: Cost;12 AWG is cheap and readily available. 2; Flexibility, the impedance match will inevitably be bent in relation to the ground plane to control the capacitive/inductive reactance and fine tune the impedance match. This allows the combination of a potentially similar geometry to that of the tapered match as well as the flexibility of controlling the reactance of the copper strip match making a wideband, smooth and extremely efficient impedance match using simple and affordable materials.

SUMMARY OF INVENTION

The following summary is provided to facilitate an understanding of some of the innovative features unique to the present invention, this is not intended to be a full description. A full description of the various aspects of the invention can be gained by taking the entire specification, claims, and abstract as a whole.

The present invention comprises an axial mode helical type antenna assembly that utilizes a hollow copper tube for the radiating element which is wound to form a helix. This helix is shortened below the standard pitch angles as stated in the classic helical formula to be 12 to 14 degrees to a new pitch angle of 5.5 degrees. This helix is supported by an FDM 3D printed cross type dielectric structure with an octagonal base which is perpendicular to and mounted to a conductive circular ground plane. The dielectric structure is semi hollow aiding in maintaining a low relative permittivity to reduce dielectric losses. There is an N type connector that is mounted to the ground plane. For the invention's feed point, between the helix and the ground plane, is a smaller diameter solid copper wire. This wire is connected to the beginning of the helix, passes through the center conductor of the N type connector, travels parallel above the ground plane but below the first ⅛ turn of the helix then gradually slopes up toward the helix and eventually meets the helix near the location of the first ¼ turn of the helix. These feeds point configuration, along with the diameter of the helix's hollow copper tube, creates an impedance match with an average reflected power of approximately 1% across the invention's operational bandwidth. This invention operates from 470 MHz to 663 MHz, creating a wide, radiating pattern while still maintaining a high forward gain and is circularly polarized. This invention has an axial length that is approximately 40% smaller than a standard axial mode helical type antenna utilizing similar operational characteristics. The invention has a dielectric protective covering sometimes referred to as a radome.

DETAILED DESCRIPTION OF THE DRAWINGS

Figure 1:
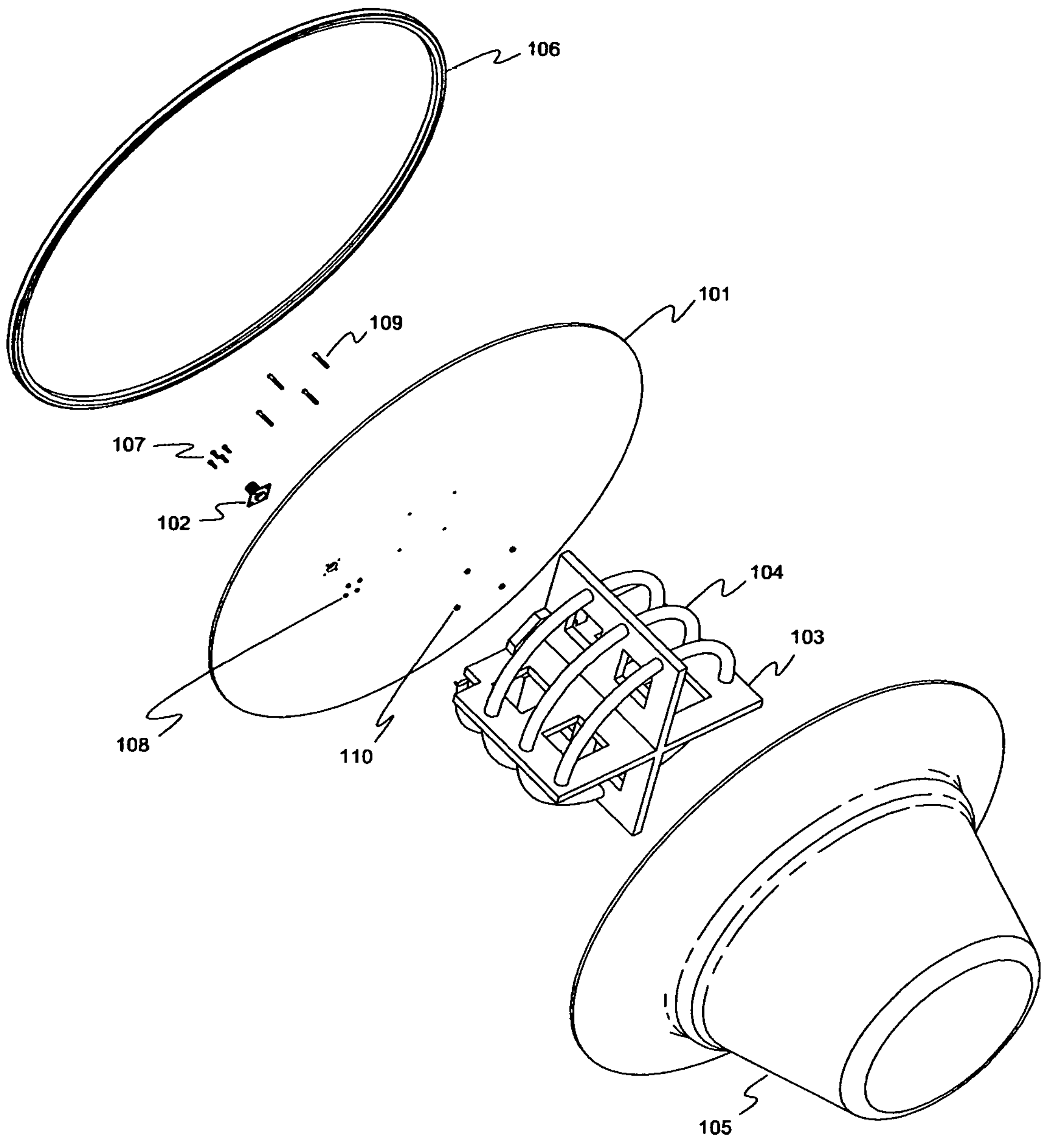
FIG. 1, is an exploded view containing an overview and all the parts involved in the entire antenna.

FIG. 1, is an exploded view containing an overview of all the parts involved in the entire antenna. A winding of hollow copper tube with an exterior diameter of 6.35 mm forming a helix type shape can be seen in (104). This helix is the main radiating structure of the antenna. Its shape, which resembles 3 coils, or circles, is largely what creates the circular polarization of the antenna. The circumference of the coils, as well as the spacing between the coils, are important to the operating parameters of the antenna, therefore a dielectric support structure, (103), maintains the dimensional accuracy of the helix. The dielectric support structure (103) also serves as a non-conductive mount to suspend the helix perpendicularly above ground plane (101). Dielectric support structure (103) is attached to ground plane (101) through holes in ground plane (101) and dielectric support structure (103) using screws (109) and nuts (110). The ground plane (101) is 381 mm in diameter, 3.175 mm thick and is generally comprised of 5052 aluminum. The ground plane (101) is essential to the axial mode helical antenna and is largely what creates forward gain. Helix (104) and ground plane (101) are both connected to N type connector (102) which serves as the input/output terminal for the antenna assembly. N type connector (102) is mounted to ground plane (101) through holes in ground plane (101) using screws (107) and nuts (108). A dielectric cover (105) comprised of 3.175 mm thick extruded ABS plastic protects the helix (104), the dielectric support structure (103) and a portion of the type N connector (102). The dielectric cover (105) is attached to the ground plane (101) using a piece of edge trim (106) that overlaps ground plane (101) and dielectric cover (105) pushing them together throughout the outer circumference of ground plane (101) and dielectric cover (105). The edge trim (106) consists of a soft rubber exterior and a flexible metal interior that grabs components inside it to keep them firmly secured such as ground plane (101) and dielectric cover (105).

Figure 2:
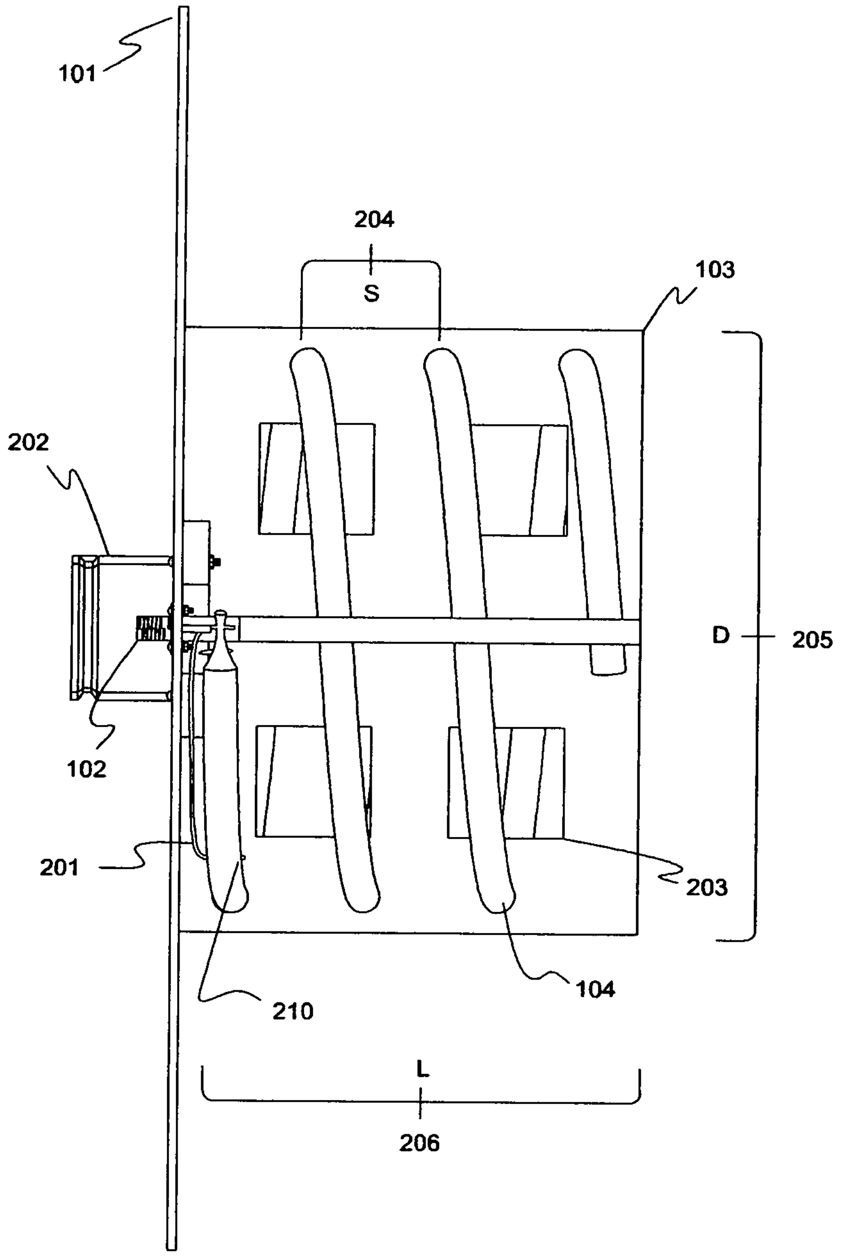
FIG. 2, is a side view of the antenna assembly minus the dielectric cover showing the impedance matching section and dimensional relationships of the antenna.

FIG. 2, is a side view of the antenna assembly, minus the dielectric cover, showing the impedance matching section and dimensional relationships of the antenna. A smaller wire running parallel to the first ¼ turn of the helix can be seen in (201), this is the parallel open wire impedance matching section and will be described in detail in further figures. The diameter of the helix "D" (205) is approximately 163 mm and corresponds to a circumference of 513 mm. These dimensions are directly related to the antennas operating range and puts the primary operating frequency of the antenna at 584 MHz. This was the center frequency for the United States UHF TV band of 470-698 MHz. However, this band has changed. The antenna is tuned using the parallel open wire impedance matching section (201) to an operating range of 470-663 MHz. The axial length of the helix "L" (206) is 150 mm and consists of 3 turns. This is the minimum number of turns to achieve circular polarization. The low number of turns combined with the axial length "L" (206) provide a more compact version of an axial mode helical antenna that achieves both a wide pattern and a high forward gain, which is usually inversely proportional where a wide pattern would equal a lower forward gain. This is possible by using a larger diameter conductor in the helix (104) and by using a pitch angle, "S" (204), much lower than specified by the classic helical formula of 12-14 degrees. The pitch angle, "S" (204), for the turns of helix (104) is 5.5 degrees. This makes the spacing between the turns of helix (104) 50 mm. Along with the electrical effects of a wide pattern with high gain, a 5.5-degree pitch angle, "S" (204), is how length "L" (206) can be as short as 150 mm while still containing 3 turns. This axial length is 40% smaller than a standard axial mode helical type antenna utilizing similar operational characteristics and does not detrimentally affect the antenna's electrical performance. Not generally used in all the antenna art, is the mounting block seen in (202). The mounting block (202) attaches to ground plane (101) and has a receptacle with 5/8-27 UNS threading to attach the antenna to common live entertainment mounting systems. To reduce weight for increased portability, openings (203) are added to the dielectric support structure (103).

Figure 3:
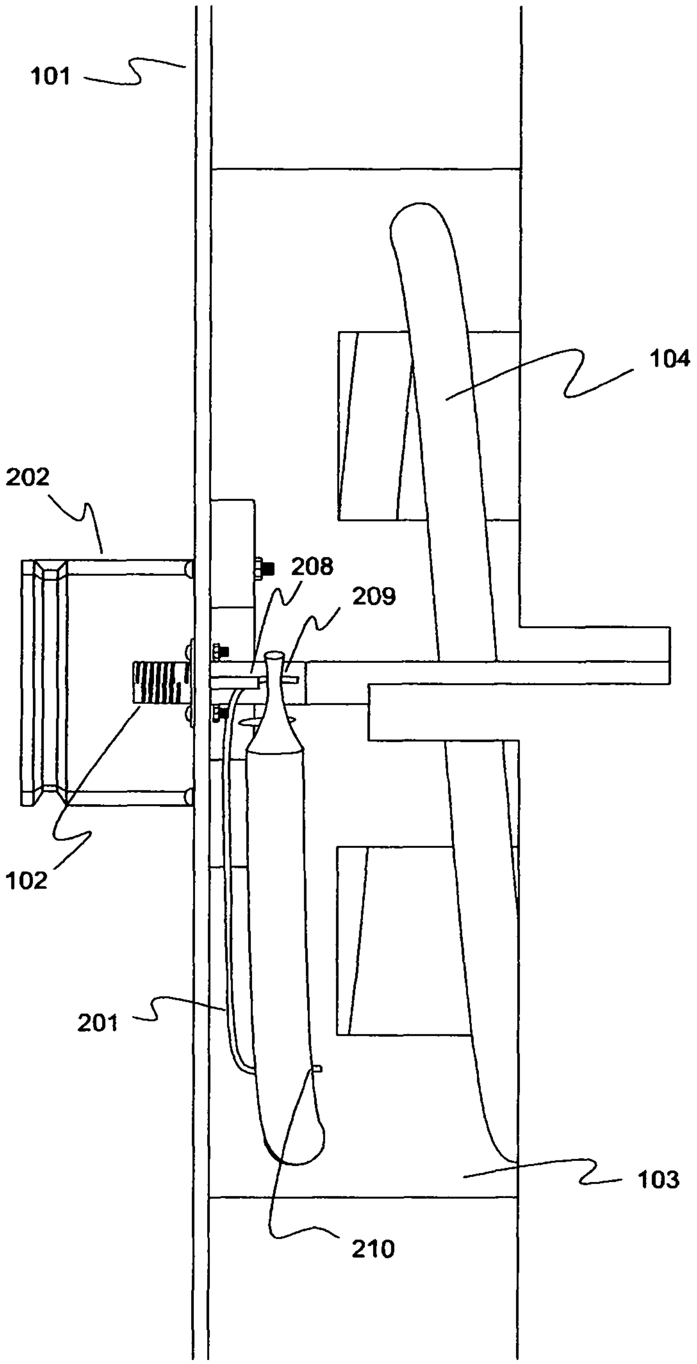
FIG. 3, is an expanded view of the impedance matching section from FIG. 2, showing details of the impedance matching section.
Figure 4:
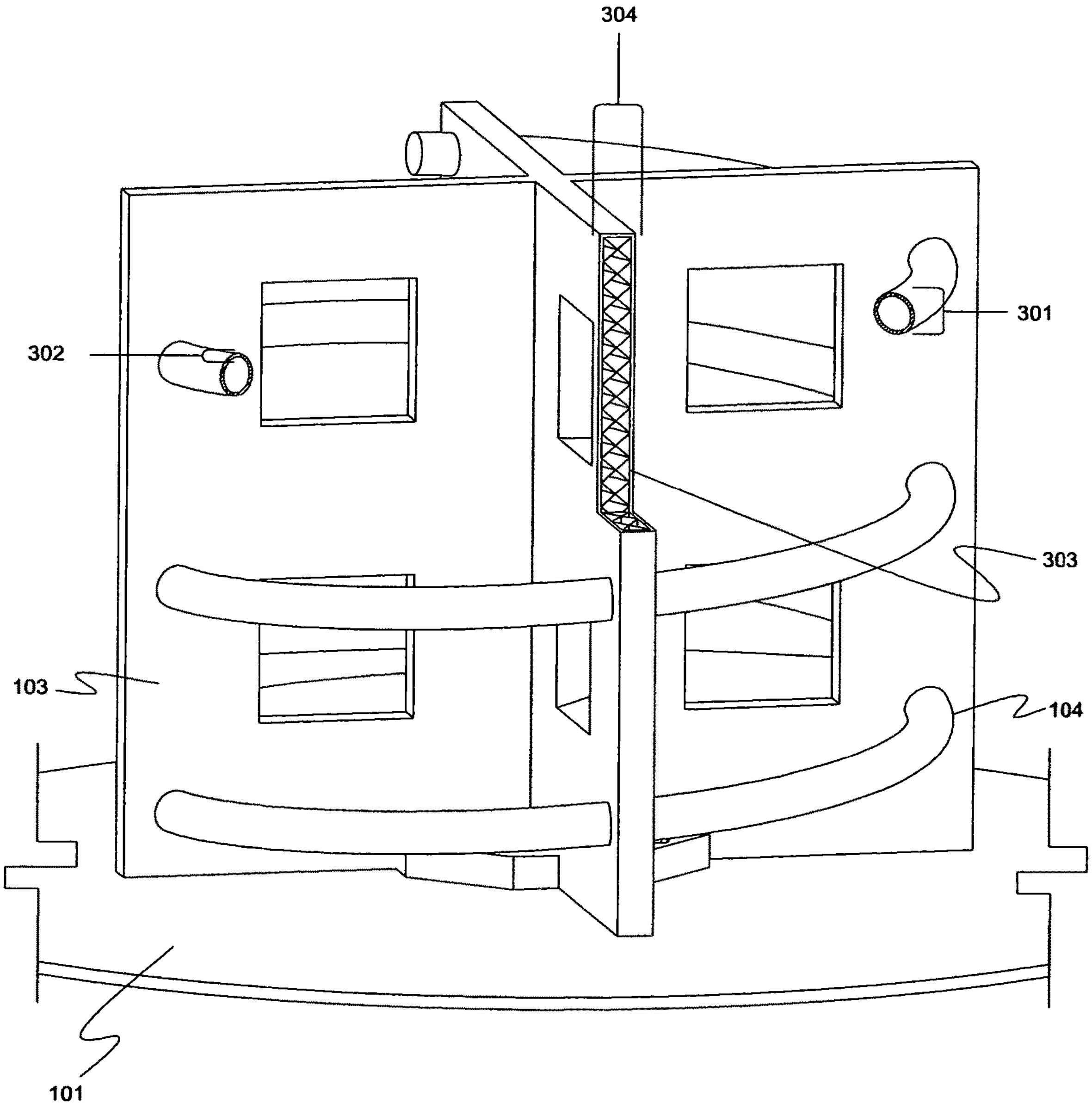
FIG. 4, is a cross section view showing the interior makeup of the dielectric support structure and the helix radiating element.

FIG. 3, is an expanded view of the impedance matching section from FIG. 2*a*, showing details of the impedance matching section, where the parallel open wire impedance matching section (201) is created using a solid copper wire approximately 32.2% the size of the hollow copper tube used in the helix (104). For the frequency ranges involved with this antenna of 470-663 MHz, the parallel open wire impedance matching section (201) is made from 12 AWG solid copper wire. The 12 AWG solid copper wire from the parallel open wire impedance matching section (201) is electrically connected to the Type N connector (102) at terminal (208) at a 90-degree section 15 mm from the beginning of the 12 AWG solid copper wire that makes up the parallel open wire impedance matching section (201). One side of the 12 AWG solid copper wire from the parallel open wire impedance matching section (201) connects to the helix (104) through a hole at the beginning of the helix seen at (209) and then soldered into place. The other side of the 12 AWG solid copper wire from the parallel open wire impedance matching section (201) connects to the helix (104) through a hole 115 mm from hole (209) as seen in (210). The 12 AWG solid copper wire from the parallel open wire impedance matching section (201) that passes through hole (210) is then soldered into place. The 12 AWG solid copper wire from the parallel open wire impedance matching section (201) can then be bent closer or farther from the ground plane (101) for fine tuning of the impedance match. The 12 AWG solid copper wire from the parallel open wire impedance matching section (201) can also be bent closer or farther from the helix (104) for fine tuning of the impedance match. Through this fine tuning the impedance match can achieve an average reflected power of approximately 1% through the operational range of the antenna of 470-663 MHz FIG. 4, is a cross section view showing the interior makeup of the dielectric support structure and the helix radiating element, one can see that the helix (104) is a hollow copper tube. The hollow copper tubing of helix (104) has an exterior diameter of 6.35 mm referenced in (301). The thickness of the hollow copper tubing from helix (104) is approximately 91 mm references in (302). These dimensions are important to the antenna's operation. In general, the larger the element of an antenna, the greater the operational bandwidth. However, radio waves, like the ones that will be radiated from an antenna, are an alternating current. It is well known that alternating currents, especially at higher frequency, experience something called skin effect. This is where the AC current only flows on the outer most diameter of the conductor it is passing through. The hollow copper tubing of helix (104) has a large enough exterior diameter of 6.35 mm as seen in (301) to maintain a large operating bandwidth and impedance match, and because of the skin effect, the 91 mm thickness of (302) is enough conductive material to make helix (104) an exceptional radiating element. Thus, the benefit of a large operating bandwidth and impedance match is achieved by the outer diameter of Helix (104) without adding excessive weight due to helix (104) being comprised of hollow copper tubing aiding in portability. The interior of dielectric support structure (103) can be seen in (303) to be a semi hollow structure with a 20% interior material density. It is made of PLA+ type plastic and printed as one piece from an FDM type 3d printer. The semi hollow interior of dielectric support structure (103) seen in (303) gives the benefit of a reduced relative permittivity compared to a solid dielectric support structure of the same size. This reduced relative permittivity means that the dielectric support structure (103) introduces minimal dielectric loss to the radio waves traveling through helix (104). In contrast, a high relative permittivity can reduce the overall gain of the antenna. Thus, the semi hollow interior of dielectric support structure (103) seen in (303) helps maintain the antennas high forward gain, even though the antenna has a wide radiating pattern. The external thickness of dielectric support structure (103) as seen in (304) is approximately 6.96 mm providing a large enough structure to adequately support the size of the helix (104) and maintain its dimensional accuracy.

Figure 5:
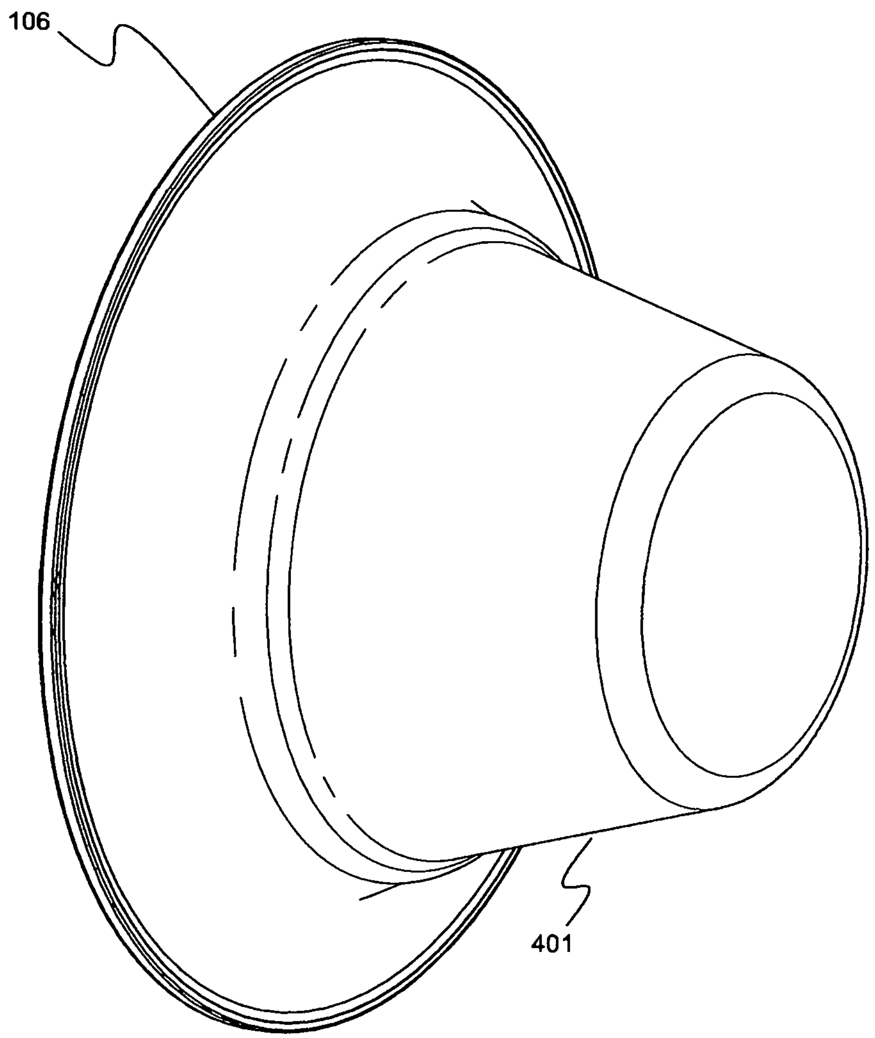
FIG. 5, is an exterior view of the completed antenna assembly.

In FIG. 5, an exterior view of the completed antenna assembly is disclosed. One can see a representation of the completed antenna (401), where dielectric cover (105), not shown, as it is now part of (401), is in place covering the antenna assembly and attached to ground plane (101), not shown as is covered, with edge trim (106). Also not shown is mounting block (202) on the back side of the assembly.

Figure 6:
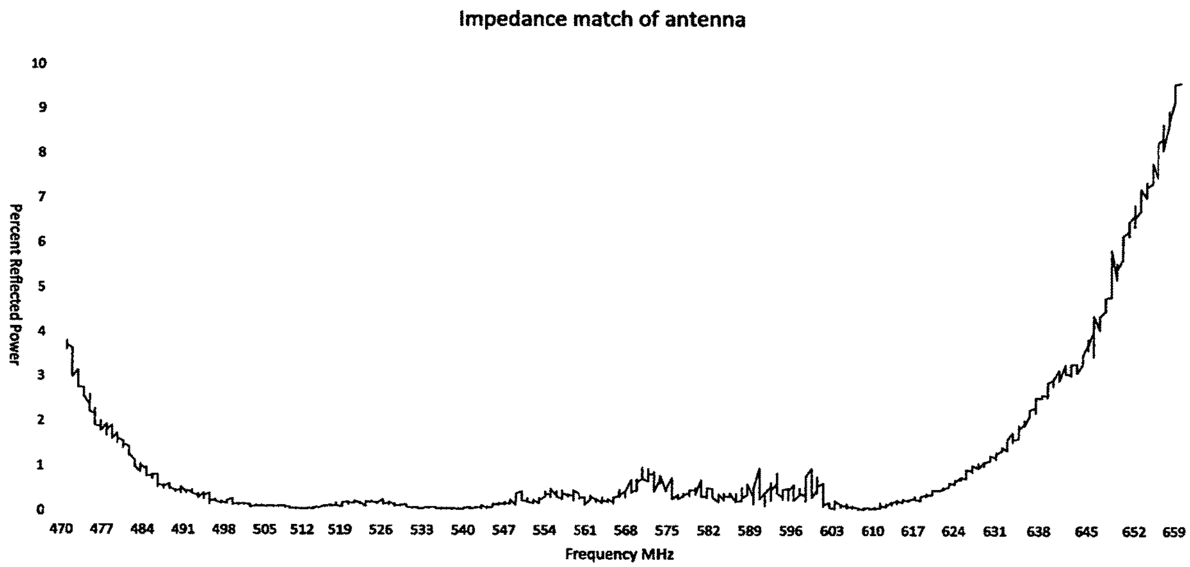
FIG. 6, is a chart representing the impedance match for the antenna.
Figure 7:
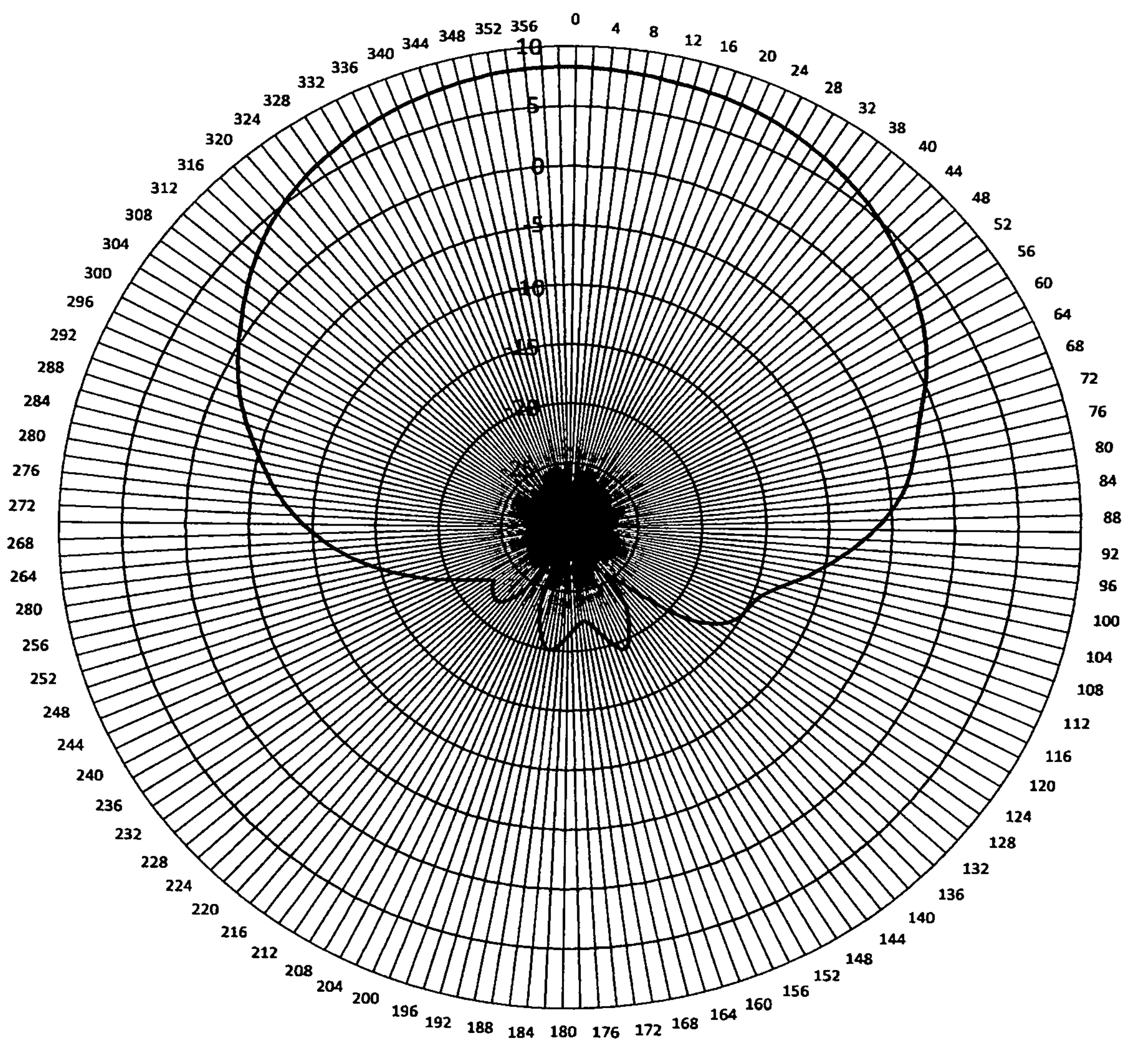
FIG. 7, is a graph representing the gain for the antenna.

In FIG. 6, a chart representing the impedance match for the antenna, we can see that the horizontal line representing the percent reflected power over frequency stays under 1% for the majority of the antenna's operating bandwidth. This equates to a calculated average reflected power of 1% throughout the antennas operating bandwidth. What has been shown fully in the description and drawings is an improved and shortened axial mode helical type antenna with a superior impedance match achieving an average reflected power of 1% through the antenna's bandwidth.

The invention claimed is:

1. A circularly polarized axial mode helical antenna assembly comprising:
- a hollow radiating helix element configured to radiate circular polarization and forward gain;
- a ground plane;
- a singular semi solid dielectric support structure;
- a dielectric protective covering;
- a parallel open wire impedance matching section connected between a connector terminal of the antenna and the hollow radiating helix element, and that serves as an impedance matching section for the circularly polarized axial mode helical antenna;
- wherein the parallel open wire impedance matching section comprises a solid copper wire running parallel above the ground plane but below the first ⅛ turn of the hollow radiating helix element then gradually sloping up toward the hollow radiating helix element and meets the hollow radiating helix element;
- wherein one side of the solid copper wire is connected to the beginning of the hollow radiating helix element, and the other side of the solid copper wire is connected to the hollow radiating helix element at approximately ¼ turn from the beginning of the hollow radiating helix element; and
- wherein the wire is electrically connected to the connector terminal at a right angle section near the beginning of the wire.

2. The circularly polarized axial mode helical antenna assembly according to claim 1, wherein the singular semi solid dielectric support structure is one piece of FDM 3D printed dielectric material.

3. The circularly polarized axial mode helical antenna assembly according to claim 1, wherein the singular semi solid dielectric support structure has an internal material density of 20%.

4. The circularly polarized axial mode helical antenna assembly according to claim 1, wherein the ground plane is made of circular disk-shaped aluminum.

5. The circularly polarized axial mode helical antenna assembly according to claim 4, wherein the circular disk-shaped aluminum ground plane dimensions consist of a diameter of 381 mm and a thickness of 3.175 mm.

6. The circularly polarized axial mode helical antenna assembly according to claim 1, wherein the hollow radiating helix element has a pitch angle of 5.5 degrees.

7. The circularly polarized axial mode helical antenna assembly according to claim 1, wherein the hollow radiating helix element further comprises of hollow copper tubing.

8. The circularly polarized axial mode helical antenna assembly according to claim 1, wherein the hollow radiating helix element further comprises of copper tubing with an exterior diameter of 6.35 mm.

9. The circularly polarized axial mode helical antenna assembly according to claim 1, wherein the hollow radiating helix element makes 3 complete turns.

10. The circularly polarized axial mode helical antenna assembly according to claim 1, wherein the antenna assembly has an operating frequency of 470 to 663 MHz.

11. A circularly polarized axial mode helical antenna comprising:

a hollow radiating helix element;

a ground plane;

a parallel open wire impedance matching section connected between a connector terminal of the antenna and the hollow radiating helix element, and that serves as an impedance matching section for the circularly polarized axial mode helical antenna;

wherein the parallel open wire impedance matching section comprises a solid copper wire running parallel above the ground plane but below the first ⅛ turn of the hollow radiating helix element then gradually sloping up toward the hollow radiating helix element and meets the hollow radiating helix element;

wherein one side of the solid copper wire is connected to the beginning of the hollow radiating helix element, and the other side of the solid copper wire is connected to the hollow radiating helix element at approximately ¼ turn from the beginning of the hollow radiating helix element; and wherein the wire is electrically connected to the connector terminal at a right angle section near the beginning of the wire.

12. The circularly polarized axial mode helical antenna according to claim 11, wherein the solid copper wire is 32.3% percent the size of the hollow radiating helix element.

13. The circularly polarized axial mode helical antenna according to claim 12, wherein the solid copper wire is 140-145 mm in total length.

14. The circularly polarized axial mode helical antenna according to claim 12, wherein the solid copper wire has a 90-degree bend 10-15 mm from the beginning of the wire.

15. The circularly polarized axial mode helical antenna according to claim 12, wherein the solid copper wire's right angle section is the only conductive element in the radiating structure to make direct contact with the connector terminal.

16. The circularly polarized axial mode helical antenna according to claim 12, wherein the solid copper wire connects to the hollow radiating helix element at the beginning of the hollow radiating helix element and 115-120 mm from the beginning of the hollow radiating helix element.

17. The circularly polarized axial mode helical antenna according to claim 12, wherein the solid copper wire is configured to be moved closer or farther from the ground plane for fine impedance matching.

18. The circularly polarized axial mode helical antenna according to claim 12, wherein the solid copper wire is configured to be moved closer or farther from the hollow radiating helix element for fine impedance matching.

19. The circularly polarized axial mode helical antenna according to claim 12, wherein the solid copper wire is attached to the hollow radiating helix element by passing through the entirety of the hollow radiating helix element and soldered to the exterior of the hollow radiating helix element.

20. The circularly polarized axial mode helical antenna according to claim 12, wherein the hollow radiating helix element connects to the right angle section of the solid copper wire at 16 mm above the ground plane.

* * * * *